(12) United States Patent
Goins

(10) Patent No.: US 7,167,086 B1
(45) Date of Patent: Jan. 23, 2007

(54) U-TURN SIGNAL

(76) Inventor: Vincent Goins, 309 W. 31st St., Long Beach, CA (US) 60806

( * ) Notice: Subject to any disclaimer, the term of this patent is extended or adjusted under 35 U.S.C. 154(b) by 108 days.

(21) Appl. No.: 11/009,780

(22) Filed: Dec. 11, 2004

(51) Int. Cl.
*B60Q 1/34* (2006.01)

(52) U.S. Cl. .................. 340/465; 340/463; 340/468; 340/475

(58) Field of Classification Search ............ 340/463, 340/465, 475, 476, 468
See application file for complete search history.

(56) References Cited

U.S. PATENT DOCUMENTS

| | | | |
|---|---|---|---|
| 4,994,786 A * | 2/1991 | Schaffer | 340/478 |
| 5,003,289 A * | 3/1991 | Roman | 340/475 |
| 5,680,100 A | 10/1997 | Millsap | 340/463 |
| 5,731,755 A | 3/1998 | Boxer | 340/465 |
| 6,043,740 A | 3/2000 | Tan | 340/475 |
| 6,195,001 B1 * | 2/2001 | Haddad et al. | 340/475 |
| 6,958,687 B1 * | 10/2005 | Smith | 340/468 |
| 2002/0008617 A1 * | 1/2002 | Lee | 340/468 |
| 2005/0024197 A1 * | 2/2005 | Cheng | 340/475 |
| 2005/0179533 A1 * | 8/2005 | Stevenson | 340/475 |

* cited by examiner

*Primary Examiner*—Jeffery Hofsass
*Assistant Examiner*—Hoi C. Lau
(74) *Attorney, Agent, or Firm*—Goldstein Law Offices PC

(57) ABSTRACT

A U-turn signal assembly for indicating to other drivers and pedestrians that a vehicle is making a U-turn. The vehicle has a left front quarter panel, a rear window, and a turn signal handle. The U-turn signal assembly has two light assemblies, one installed on the left front quarter panel of the vehicle and the other one installed on the rear window of the vehicle. The light assemblies each have a lens, backlit by a light fixture. The lens has a plurality of lettering and arrows for uniquely signaling the U-turn. An activation switch is attached to the turn signal handle. A control panel is in communication with the activation switch and light assemblies for controlling the light assemblies.

4 Claims, 2 Drawing Sheets

U-TURN SIGNAL

BACKGROUND OF THE INVENTION

The invention relates to signal lights, and more particularly, to two U-turn signal lights installed on a vehicle, which when activated by a driver, indicate to other drivers and pedestrians that the vehicle is making a U-turn.

All cars today are equipped with turn signals which are usually individual light assemblies on the front end of a vehicle and an integral part of the tail light or brake light assemblies mounted on the rear end of a vehicle. Whenever a turn signal is activated, a corresponding light on the front and rear of the vehicle will illuminate and flash to advise cars and pedestrians, of the driver's intent to turn to the left or right. In addition to the need to advise other motorists and pedestrians whenever a left or right turn is to be made, there are many occasions when a driver must make a U-turn but there are no provisions for indicating to others the intent to make this type of turn.

U.S. Pat. No. 5,003,289 Roman discloses an auxiliary U-turn signal attachment for a vehicle capable of being mounted to a vehicle window and controlled by a manual switch on the turn signal to alert traffic of the intentions of the driver. U.S. Pat. No. 5,680,100 to Millsap discloses a U-turn signal light located on both the rear and front of a vehicle, operated using a dashboard mounted switch. U.S. Pat. No. 6,043,740 to Tan discloses a vehicle U-turn signaling device comprised of an array of LED's that form a loop with an arrow configuration. U.S. Pat. No. 5,731,755 to Boxer discloses a U-turn indicator comprised of a series of sequentially illuminated lights that form the letter "U".

While these units may be suitable for the particular purpose employed, or for general use, they would not be as suitable for the purposes of the present invention as disclosed hereafter.

SUMMARY OF THE INVENTION

It is an object of the invention to produce a means for indicating to other drivers and pedestrians that the vehicle would be making a U-turn. Accordingly, the invention is a U-turn signal assembly having two light assemblies, one installed on a left front quarter panel of a vehicle and the other one installed on a rear window of the vehicle, for indicating to other drivers and pedestrians that the vehicle is making a U-turn.

It is another object of the invention to provide an easy means for activating the U-turn signal assembly. Accordingly, the invention has an activation switch attached to a turn signal handle in communication with a control panel for controlling the light assemblies.

This invention is a U-turn signal assembly for indicating to other drivers and pedestrians that a vehicle is making a U-turn. The vehicle has a left front quarter panel, a rear window, and a turn signal handle. The U-turn signal assembly has two light assemblies, one installed on the left front quarter panel of the vehicle and the other one installed on the rear window of the vehicle. The light assemblies each have a lens, backlit by a light fixture. The lens has a plurality of lettering and arrows for uniquely signaling the U-turn. An activation switch is attached to the turn signal handle. A control panel is in communication with the activation switch and light assemblies for controlling the light assemblies.

To the accomplishment of the above and related objects the invention may be embodied in the form illustrated in the accompanying drawings. Attention is called to the fact, however, that the drawings are illustrative only. Variations are contemplated as being part of the invention, limited only by the scope of the claims.

BRIEF DESCRIPTION OF THE DRAWINGS

In the drawings, like elements are depicted by like reference numerals. The drawings are briefly described as follows.

DETAILED DESCRIPTION OF THE PREFERRED EMBODIMENTS

Figure 1:
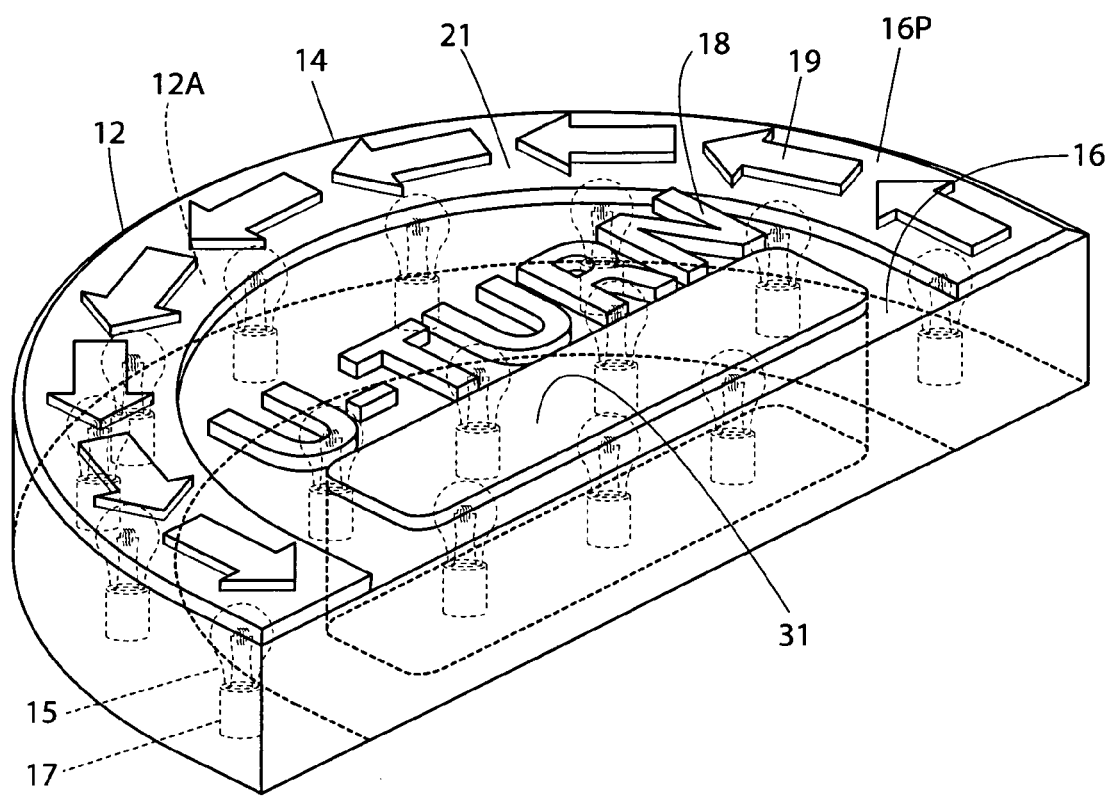
FIG. 1 is a diagrammatic perspective view of the U-turn signal assembly of the present invention having light assemblies, having a lens with a plurality of arrows and lettering thereon.

FIG. 1 illustrates a U-turn signal assembly 10 of the present invention for indicating to other drivers and pedestrians that the vehicle is making a U-turn. The vehicle has a left front quarter panel, a rear window, a brake, a brake light, and a turn signal handle having an end.

Figure 3:
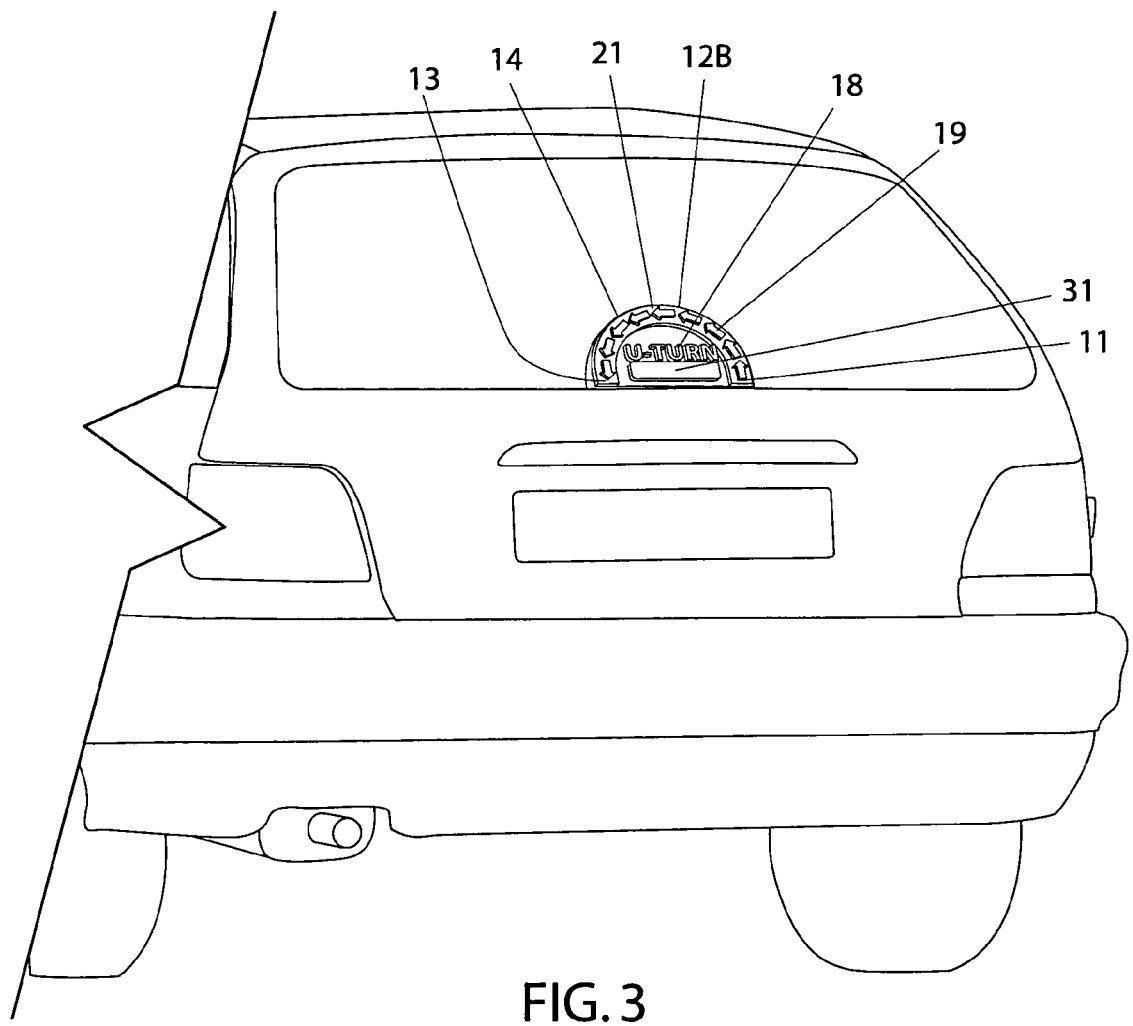
FIG. 3 is a diagrammatic perspective view of one of the light assemblies of the present invention installed on a rear window of a vehicle.

The U-turn signal assembly 10 includes two light assemblies 12, including a first light assembly 12A and a second light assembly 12B. The first and second light assemblies 12A and 12B each have a rounded top 14, a lower right side 11, and a lower left side 13. The light assemblies 12 are preferably metal, and have a lens 16, preferably plastic. A light fixture 17, having bulbs 15 is within the light assemblies 12. The lens 16 is fitted over the light fixture and bulbs, and has a rectangular section 31, substantially red. The lens 16 is essentially backlit by the light fixture 17. The lens 16 includes an outer periphery 16P. A plurality of imprinted letters 18, which spell out "U-Turn" are centrally positioned along the lens 16. The outer periphery 16P includes a plurality of arrows 19 which form an arch 21. The letters 18 and arrows 19 are preferably red in color. The remainder of the lens 16 is preferably white in color. The first light assembly 12A is installed on the front quarter panel of the vehicle. The second light assembly 12B is installed on the rear window of the vehicle, as shown in FIG. 3. The light assemblies 12A and 12B consist of an array of LEDs which makes a loop circuit with the plurality of arrows 19.

Figure 2:
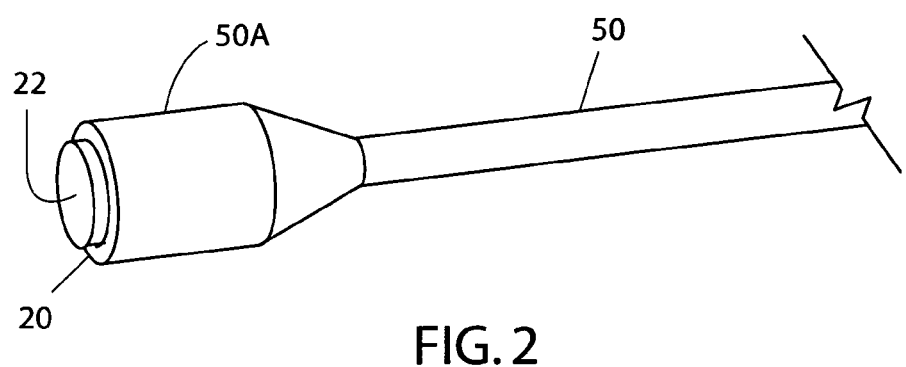
FIG. 2 is a diagrammatic perspective view of the turn signal handle of the present invention having an activation switch thereon for triggering the control panel to activate the light assemblies.
Figure 4:
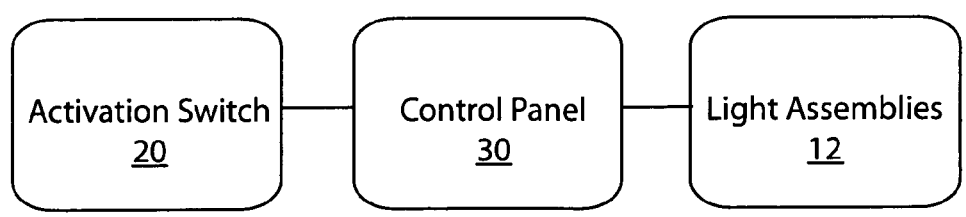
FIG. 4 is a block diagram of the present invention having the activation switch in communication with a control panel in communication for controlling the light assemblies.

FIG. 2 illustrates the U-turn signal assembly including an activation switch 20 having an on position 22, depressed as shown, and an off position 24 elevated. FIG. 4, illustrates a block diagram of the invention. There, a control panel 30 is wired to the activation switch 20 and the light assemblies 12 for controlling the light assemblies 12. The activation switch 20 is attached to the end 50A of the turn signal handle 50.

FIG. 3 illustrates the second light assemblies 12B in use. When a driver turns the activation switch into the on position, the activation switch 20 signals the control panel to activate the second light assembly 12B. Here, the letters 18 light up and the arrows 19 are sequentially illuminated along the arch 21, from the lower right side 11 along the rounded top 14, and to the lower left side 13. This effectively indicates to motorists that the driver is making a U-turn. The rectangular section 31 is the brake light which lights up when the brakes are applied. A portion of the light fixture and bulbs behind the rectangular section 31 are electrically connected in series with existing brake lights and power is applied simultaneously to the brake lights and the rectangular section 31 whenever the brakes are applied. The driver then deactivates the light assemblies 12 by turning the activation switch into the off position and causing the control panel to signal the light fixture of the second light assembly 12B to stop lighting up.

All vehicles with the U-turn signal assembly 10 visually alert any pedestrians or vehicles that the vehicle is making a U-turn toward the left, as indicated by the arrows 19. The visual alert adds safety to the vehicle, pedestrians, and other vehicles for facilitating better flow of traffic.

In conclusion, herein is presented a U-turn signal assembly. The invention is illustrated by example in the drawing figures, and throughout the written description. It should be understood that numerous variations are possible, while adhering to the inventive concept. Such variations are contemplated as being a part of the present invention.

What is claimed is:

1. A U-turn signal assembly for indicating to other drivers and pedestrians that a vehicle is making a U-turn, the vehicle having a left front quarter panel, a rear window, a brake, a brake light, and a turn signal handle having an end, comprising:

a pair of light assemblies including a first light assembly and a second light assembly, each having a rounded top, a lower right side, and a lower left side, each having a lens having a rectangular section and an outer periphery, and having a light fixture having bulbs, the lens being fitted over the light fixture and bulbs, having imprinted letters which spell out "U-Turn" centrally positionable along the lens, and the outer periphery having a plurality of arrows which form an arch, the first light assembly being installed on the front quarter panel of the vehicle, the second light assembly being installed on the rear window of the vehicle, the light assemblies consisting of an array of light emitting diodes which makes a loop circuit with the arrows;

an activation switch having an on position and an off position, and being attached to the end of the turn signal handle; and a control panel wired to the activation switch and the light assemblies for controlling the light assemblies.

2. A U-turn signal assembly for indicating to other drivers and pedestrians that a vehicle is making a U-turn, the vehicle having a left front quarter panel, a rear window, a brake, a brake light, and a turn signal handle having an end, comprising:

a pair of light assemblies including a first light assembly and a second light assembly, each having a lens having an outer periphery, and having a light fixture having bulbs, the lens being fitted over the light fixture and bulbs, a plurality of imprinted letters which spell out "U-Turn" centrally positionable within the lens wherein the lens has a rectangular section, and the outer periphery having a plurality of arrows which form an arch, the light assemblies consisting of an array of light emitting diodes which makes a loop circuit with the arrows;

an activation switch having an on position and an off position, and being attached to the end of the turn signal handle; and a control panel wired to the activation switch and the light assemblies for controlling the light assemblies.

3. The U-turn signal assembly of claim 2, wherein each light assembly has a rounded top, a lower right side, and a lower left side.

4. The U-turn signal assembly of claim 3, wherein the first light assembly is installed on the front quarter panel of the vehicle, and the second light assembly is installed on the rear window of the vehicle.

\* \* \* \* \*